United States Patent
Liu et al.

(10) Patent No.: US 11,203,029 B2
(45) Date of Patent: Dec. 21, 2021

(54) MOLD PAINT-SPRAYING DEVICE

(71) Applicant: CITIC Dicastal CO., LTD., Hebei (CN)

(72) Inventors: Weidong Liu, Qinhuangdao (CN); Shiwen Xu, Qinhuangdao (CN); Weizhi Zhang, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 108 days.

(21) Appl. No.: 16/713,537

(22) Filed: Dec. 13, 2019

(65) Prior Publication Data

US 2020/0406282 A1    Dec. 31, 2020

(30) Foreign Application Priority Data

Jun. 27, 2019    (CN) .......................... 201910565594.3

(51) Int. Cl.
*B05B 13/02*    (2006.01)
*B05C 5/02*    (2006.01)
*B05B 13/04*    (2006.01)

(52) U.S. Cl.
CPC .......... *B05B 13/0278* (2013.01); *B05B 13/02* (2013.01); *B05B 13/0285* (2013.01); *B05B 13/041* (2013.01); *B05B 13/0421* (2013.01); *B05C 5/02* (2013.01)

(58) Field of Classification Search
None
See application file for complete search history.

(56) References Cited

U.S. PATENT DOCUMENTS

| | | | | |
|---|---|---|---|---|
| 3,592,387 A | * | 7/1971 | Pilott | B05B 13/041 |
| | | | | 239/752 |
| 4,864,965 A | * | 9/1989 | Okuda | B05B 16/00 |
| | | | | 118/323 |
| 2017/0182551 A1 | * | 6/2017 | Xue | B05C 1/027 |

* cited by examiner

*Primary Examiner* — Jethro M. Pence
(74) *Attorney, Agent, or Firm* — Cooper Legal Group, LLC

(57) ABSTRACT

A mold paint-spraying device includes a frame and a mold fixed to the frame. A motor is fixed to the frame, an output end of the motor is fixedly connected to a mounting rack, a servo motor and a linear guide rail are fixedly connected to the mounting rack, a rail slide is arranged on the linear guide rail, a screw nut is fixed on the rail slide, a spray gun is fixed on the screw nut, and an output end of the servo motor is connected with a screw matching the screw nut.

7 Claims, 1 Drawing Sheet

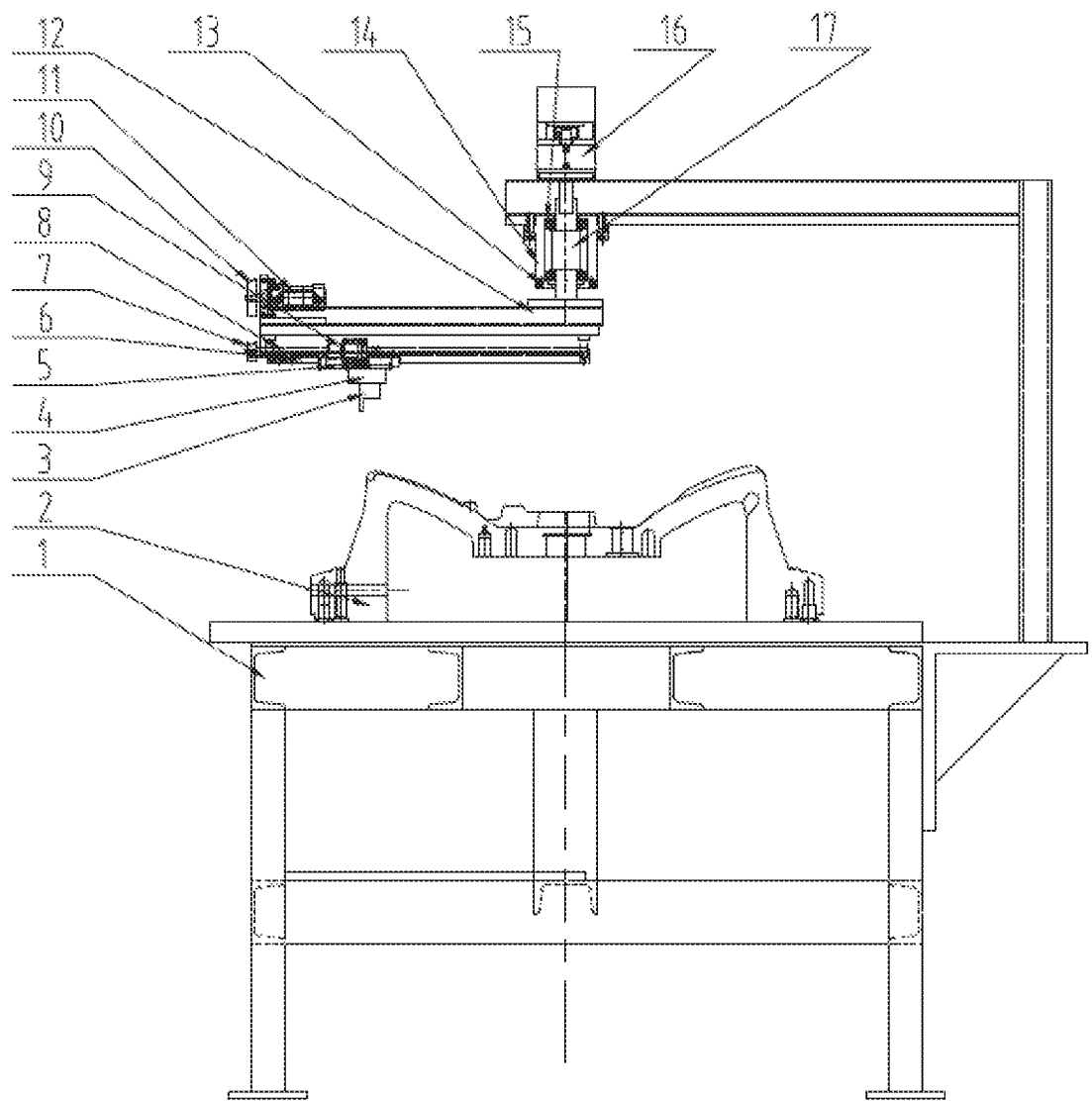

MOLD PAINT-SPRAYING DEVICE

CROSS-REFERENCE TO RELATED APPLICATIONS

The present application claims benefit of Chinese Patent Application No. 201910565594.3, filed on Jun. 27, 2019, the contents of which are hereby incorporated by reference in its entirety.

BACKGROUND

Wheels are important safety parts and appearance parts of an automobile. The molding process of a wheel blank is a key factor affecting the quality of a wheel. During processing of the wheel, the paint spraying effect of a mold is a key factor affecting the die casting effect of the wheel blank. Automobile manufacturers now generally manually spray paint. With such a paint spraying method, the thickness of mold paint is not uniform, and this defect of the mold seriously affects the pass rate of the blank wheel. At the same time, this processing method requires the operator to have rich work experience, and has the problems of high labor intensity, poor working environment, low efficiency and the like.

SUMMARY

The present disclosure relates to the field of paint spraying technology, and specifically to a mold paint-spraying device.

In view of this, the present disclosure is directed to propose a mold paint-spraying device which can meet the needs of mold paint-spraying, and has the characteristics of simple structure, convenient manufacture, stable performance, high efficiency and high precision.

In order to achieve the above objective, the technical solution of the present disclosure is realized as follows.

A mold paint-spraying device, including a frame, a motor is fixed to the frame, an output end of the motor is fixedly connected to a mounting rack, a servo motor and a linear guide rail are fixedly connected to the mounting rack, a rail slide is arranged on the linear guide rail, a screw nut is fixed on the rail slide, a spray gun is fixed on the screw nut, and an output end of the servo motor is connected with a screw matching the screw nut.

In an embodiment, a shaft sleeve is also fixed to the frame, a rotating shaft is rotatably connected into the shaft sleeve, the output end of the motor is fixedly connected to one end of the rotating shaft, and the other end of the rotating shaft is fixedly connected to the mounting rack.

In an embodiment, the servo motor is fixed to the upper part of the mounting rack, the screw is arranged at the lower part of the mounting rack, a driving wheel is fixedly connected to the output end of the servo motor, a driven wheel is fixedly connected to one end of the screw, and the driving wheel is in transmission connection with the driven wheel.

In an embodiment, the driving wheel is in transmission connection with the driven wheel by a synchronous belt.

In an embodiment, a mounting plate is fixedly connected between the screw nut and the spray gun.

In an embodiment, the shaft sleeve is rotatably connected to the rotating shaft via bearings, and the bearings and the rotating shaft are mounted into the shaft sleeve via a press plate.

In an embodiment, two bearings are arranged at the upper and lower parts within the shaft sleeve.

Compared with the prior art, the mold paint-spraying device of the present disclosure has the following advantages:

The mold paint-spraying device of the present disclosure can meet the requirements of paint spraying of the mold, and has the characteristics of simple structure, convenient manufacture, stable performance, high efficiency, high precision and the like.

BRIEF DESCRIPTION OF THE DRAWING

The accompanying drawing constituting a part of the present disclosure is used for providing a further understanding of the present disclosure, and the schematic embodiments of the present disclosure and the descriptions thereof are used for interpreting the present disclosure, rather than constituting improper limitations to the present disclosure. In the drawing:

FIG. 1 is a schematic structural diagram of a mold paint-spraying device according to the present disclosure.

REFERENCE SIGNS

1—frame, 2—mold, 3—spray gun, 4—mounting plate, 5—guide rail sliding seat, 6—linear guide rail, 7—driven wheel, 8—screw, 9—screw nut, 10—driving wheel, 11—servo motor, 12—mounting rack, 13—press plate, 14—shaft sleeve, 15—bearing, 16—motor, 17—rotating shaft

DETAILED DESCRIPTION

It should be noted that the embodiments in the present disclosure and the features in the embodiments can be combined with each other without conflicts.

The following clearly and completely describes the technical solutions of the present disclosure with reference to the accompanying drawing and in combination with the embodiments. Apparently, the described embodiments are part of, not all of, the embodiments of the present disclosure. All other embodiments obtained by a person skilled in the art based on the embodiments of the present disclosure without creative efforts shall fall within the protection scope of the present disclosure.

A mold paint-spraying device according to an embodiment of the present disclosure will be described below with reference to FIG. 1 and in combination with embodiments.

A mold paint-spraying device, including a frame 1 and a mold 2 fixed to the frame 1, in which a motor 16 is fixed to the frame 1, an output end of the motor 16 is fixedly connected to a mounting rack 12, the motor 16 can drive the mounting rack 12 to rotate, a servo motor 11 and a linear guide rail 6 are fixedly connected to the mounting rack 12, a guide rail sliding seat 5 is arranged on the linear guide rail 6, a screw nut 9 is fixed on the guide rail sliding seat 5, a spray gun 3 is fixed on the screw nut 9, an output end of the servo motor 11 is connected with a screw 8 cooperating with the screw nut 9, the servo motor 11 can drive the screw 8 to rotate, the spray gun 3 moves horizontally along the linear guide rail 6 by means of threaded engagement between the screw 8 and the screw nut 9, and a control system controls the direction and number of revolutions of the servo motor 11 through a pre-written program so as to control the moving trajectory of the spray gun 3.

In an embodiment, a shaft sleeve 14 is also fixed to the frame, a rotating shaft 17 is rotatably connected into the shaft sleeve 14, the output end of the motor 16 is fixedly connected to one end of the rotating shaft 17, the other end of the rotating shaft 17 is fixedly connected to the mounting rack 12, and the motor 16 can drive the mounting rack 12 to rotate about the rotating shaft 17.

In an embodiment, the servo motor 11 is fixed to the upper part of the mounting rack 12, the screw 8 is arranged at the lower part of the mounting rack 12, a driving wheel 10 is fixedly connected to the output end of the servo motor 11, a driven wheel 7 is fixedly connected to one end of the screw, and the driving wheel 10 is in transmission connection with the driven wheel 7.

In an embodiment, the driving wheel 10 is in transmission connection with the driven wheel 7 by a synchronous belt.

In an embodiment, a mounting plate 4 is fixedly connected between the screw nut 9 and the spray gun 3.

In an embodiment, the shaft sleeve 14 is rotatably connected to the rotating shaft 17 via bearings 15, and the bearings 15 and the rotating shaft 17 are mounted into the shaft sleeve 14 via a press plate 13.

In an embodiment, two bearings 15 are arranged at the upper and lower parts within the shaft sleeve 14.

In an embodiment, the mold 2 is placed in the middle of the frame 1, the motor 16 drives the mounting rack 12 to rotate about the rotating shaft 17, then, the control system controls the direction and number of revolutions of the servo motor 11 through the pre-written program, and the horizontal moving trajectory of the spray gun 3 along the linear guide rail 6 is finally controlled by means of engaged transmission between the screw 8 and the screw nut 9, thereby implementing paint spraying of the mold 2.

Compared with the prior art, the mold paint-spraying device of the present disclosure has the following advantages:

The mold paint-spraying device of the present disclosure can meet the requirements of paint spraying of the mold, and has the characteristics of simple structure, convenient manufacture, stable performance, high efficiency, high precision and the like.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

The invention claimed is:

1. A mold paint-spraying device, comprising a frame, wherein a motor is fixed to the frame, an output end of the motor is fixedly connected to a mounting rack, a servo motor and a linear guide rail are fixedly connected to the mounting rack, a rail slide is arranged on the linear guide rail, a screw nut is fixed on the rail slide, a spray gun is fixed on the screw nut, an output end of the servo motor is connected with a screw matching the screw nut, the servo motor drives the screw to rotate, and the spray gun moves horizontally along the linear guide rail by means of threaded engagement between the screw and the screw nut.

2. The mold paint-spraying device according to claim 1, wherein a shaft sleeve is fixed to the frame, a rotating shaft is rotatably connected into the shaft sleeve, the output end of the motor is fixedly connected to one end of the rotating shaft, and the other end of the rotating shaft is fixedly connected to the mounting rack.

3. The mold paint-spraying device according to claim 2, wherein the servo motor is fixed to an upper part of the mounting rack, the screw is arranged at a lower part of the mounting rack, a driving wheel is fixedly connected to the output end of the servo motor, a driven wheel is fixedly connected to one end of the screw, and the driving wheel is in transmission connection with the driven wheel.

4. The mold paint-spraying device according to claim 3, wherein the driving wheel is in transmission connection with the driven wheel by a synchronous belt.

5. The mold paint-spraying device according to claim 3, wherein a mounting plate is fixedly connected between the screw nut and the spray gun.

6. The mold paint-spraying device according to claim 2, wherein the shaft sleeve is rotatably connected to the rotating shaft via bearings, and the bearings and the rotating shaft are mounted into the shaft sleeve via a press plate.

7. The mold paint-spraying device according to claim 6, wherein two bearings are arranged at upper and lower parts within the shaft sleeve.

* * * * *